US012713479B2

(12) United States Patent
Bhargava et al.

(10) Patent No.: US 12,713,479 B2
(45) Date of Patent: Aug. 18, 2026

(54) METHODS AND SYSTEMS FOR PAIRING INTERACTIVE OBJECTS AND USER DEVICES

(71) Applicants: Dev Bhargava, San Francisco, CA (US); Alejandro Kauffmann, San Francisco, CA (US); Google LLC, Mountain View, CA (US)

(72) Inventors: Dev Bhargava, San Francisco, CA (US); Alejandro Kauffmann, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 800 days.

(21) Appl. No.: 18/010,149

(22) PCT Filed: Aug. 31, 2020

(86) PCT No.: PCT/US2020/048778

§ 371 (c)(1),
(2) Date: Dec. 13, 2022

(87) PCT Pub. No.: WO2022/046111

PCT Pub. Date: Mar. 3, 2022

(65) Prior Publication Data

US 2023/0269801 A1 Aug. 24, 2023

(51) Int. Cl.
*H04W 76/14* (2018.01)
*G06F 3/01* (2006.01)
*H04M 1/72412* (2021.01)

(52) U.S. Cl.
CPC ............ *H04W 76/14* (2018.02); *G06F 3/017* (2013.01); *H04M 1/72412* (2021.01)

(58) Field of Classification Search
CPC . H01Q 1/273; H01Q 1/27; G08B 7/06; G08B 21/22; H04B 1/385; H04W 4/80;
(Continued)

(56) References Cited

U.S. PATENT DOCUMENTS 9,674,686 B2 * 6/2017 Bahadirov ............ H04W 8/005
11,045,738 B1 * 6/2021 Unruh .................. A63F 13/235
(Continued)

OTHER PUBLICATIONS

International Preliminary Report on Patentability for Application No. PCT/US2020/048778, mailed Mar. 9, 2023, 10 pages.
(Continued)

*Primary Examiner* — Cindy Trandai
(74) *Attorney, Agent, or Firm* — DORITY & MANNING P.A.

(57) ABSTRACT

The present disclosure is directed to pairing of electronic devices. An example computer-implemented method includes detecting, by an interactive object, user input with the interactive object. The method further includes generating, by the interactive object in response to detecting the user input, a pairing communication for a user device. The pairing communication can include an interactive object identifier and data indicative of a pairing output signal that is emittable by the interactive object. The method further includes providing, by the interactive object, the pairing communication to the user device. The method further includes generating, by the interactive object, the pairing output signal via one or more output devices. The pairing output signal includes at least one of a visual signal or an audio signal of the interactive object. The user device and the interactive object can be paired based at least in part on the pairing output signal.

14 Claims, 9 Drawing Sheets

(58) Field of Classification Search
CPC .............. G16H 10/65; A61B 5/150786; A61B 5/150793; A61B 5/150862; A61B 5/15087; A61B 5/117; G02B 27/017; G02B 2027/014
See application file for complete search history.

(56) References Cited

U.S. PATENT DOCUMENTS

| | | | | |
|---|---|---|---|---|
| 2007/0141989 | A1 | 6/2007 | Flinchem | |
| 2008/0113618 | A1 | 5/2008 | De Leon et al. | |
| 2010/0167646 | A1* | 7/2010 | Alameh | H04W 12/06 455/41.2 |
| 2012/0122575 | A1* | 5/2012 | Barney | A63F 13/219 463/31 |
| 2014/0056172 | A1* | 2/2014 | Lee | H04B 10/116 370/254 |
| 2015/0245164 | A1* | 8/2015 | Merrill | H04W 4/06 370/329 |
| 2015/0310735 | A1* | 10/2015 | Ke | H04M 1/72442 367/197 |
| 2016/0292563 | A1* | 10/2016 | Park | G06F 3/016 |
| 2020/0236724 | A1 | 7/2020 | Ehlert et al. | |

OTHER PUBLICATIONS

International Search Report for Application No. PCT/ US2020/ 048778, mailed on May 11, 2021, 3 pages.

EE Times, "Make the Most of Bluetooth LE Advertising Mode", https ://ww w.eetimes.com/make-the-most-of-bluetooth-le-advertising-mode/, retrieved on Jan. 31, 2023, 5 pages.

Townsend et al., "Getting Started with Bluetooth Low Energy: Tools and Techniques for Low-Power Networking", 2014 (First Edition) O'Reilly Media, Inc. https://dl.acm.org/doi/10.5555/ 2621948, retrieved on Jan. 31, 2023, 5 pages.

* cited by examiner 200
205A
210A
215A
220A
205B
210B
215B
220B
205C
210C
215C
220C
205D
210D
215D
220D
205E
210E
215E
220E
205F
210F
215F
220F

300

| HEADER | PAYLOAD | MIC |
|---|---|---|
| ---- | INTERACTION OBJECT IDENTIFIER; PAIRING OUTPUT SIGNAL AND CHARACTERISTIC(S); SENSOR REC. | ---- |

| ID | PAIRING OUTPUT SIGNAL/CHARACTERISTIC(S) | TIME |
|---|---|---|
| TR123126 | LIGHT SIGNAL; GREEN | $T_1$ |
| HP0780 | LIGHT SIGNAL; GOLD; FREQUENCY/PULSE | $T_2$ |
| HG1979 | SOUND; MELODY; PITCH | $T_3$ |
| RW3180 | AUDIO SENSOR; SOUND; PITCH | $T_4$ |
| NTH ID | NTH PAIRING SIGNAL | $T_N$ |

FIG. 4

METHODS AND SYSTEMS FOR PAIRING INTERACTIVE OBJECTS AND USER DEVICES

PRIORITY CLAIM

This application is based upon and claims the right of priority under 35 U.S.C. § 371 to International Application No. PCT/US2020/048778 filed on Aug. 31, 2020, which is incorporated by reference herein.

FIELD

The present disclosure relates generally to pairing electronic devices. More particularly, the present disclosure relates to pairing electronic interactive devices with user devices for leveraging the computing resources of the user device.

BACKGROUND

Pairing processes can be utilized to create a communication linkage between computing devices. Once paired, the computing devices can communicate to share data and/or initiate certain actions. Simultaneous attempts to pair computing devices within the same vicinity can cause confusion for the computing devices.

SUMMARY

Aspects and advantages of embodiments of the present disclosure will be set forth in part in the following description, or can be learned from the description, or can be learned through practice of the embodiments.

One example aspect of the present disclosure is a computer-implemented method for device pairing. The method includes detecting, by an interactive object, user input with the interactive object. The method includes in response to detecting the user input, generating, by the interactive object, a pairing communication for a user device. The pairing communication includes an interactive object identifier and data indicative of a pairing output signal that is emittable by the interactive object. The method includes providing, by the interactive object, the pairing communication to the user device. The method includes generating, by the interactive object, the pairing output signal via one or more output devices. The pairing output signal includes at least one of a visual signal or an audio signal of the interactive object.

Another example aspect of the present disclosure is a user device. The user device includes one or more processors and one or more tangible, non-transitory, computer readable media that collectively store instructions that when executed by the one or more processors cause the user device to perform operations. The operations comprise obtaining a pairing communication from an interactive object. The operations comprise determining a pairing output signal that is emittable by the interactive object based at least in part on the pairing communication from the interactive object. The pairing output signal is emittable by the interactive object for pairing with the user device. The operations include activating one or more sensors of the user device based at least in part on the pairing output signal indicated in the pairing communication. The operations include detecting, via the one or more sensors of the user device, the pairing output signal from the interactive object. The operations include pairing the user device with the interactive object based at least in part on the pairing communication and the pairing output signal.

Yet another example aspect of the present disclosure is an interactive object. The interactive object includes one or more processors and one or more tangible, non-transitory, computer readable media that collectively store instructions that when executed by the one or more processors cause the interactive object to perform operations. The operations include detecting user input associated with the interactive object. The user input includes a physical contact with the interactive object. The operations include generating a pairing communication based at least in part on the user input. The pairing communication includes an interactive object identifier and data indicative of a pairing output signal that is emittable by the interactive object. The operations include providing the pairing communication to a user device. The operations include generating the pairing output signal via one or more output devices of the interactive object. The pairing output signal includes at least one of a visual signal or an audio signal of the interactive object.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3 depicts an example contents of a pairing communication according to example aspects of the present disclosure;

FIG. 4 depicts an example pairing data structure of a user device according to example aspects of the present disclosure;

DETAILED DESCRIPTION

Figure 1A:
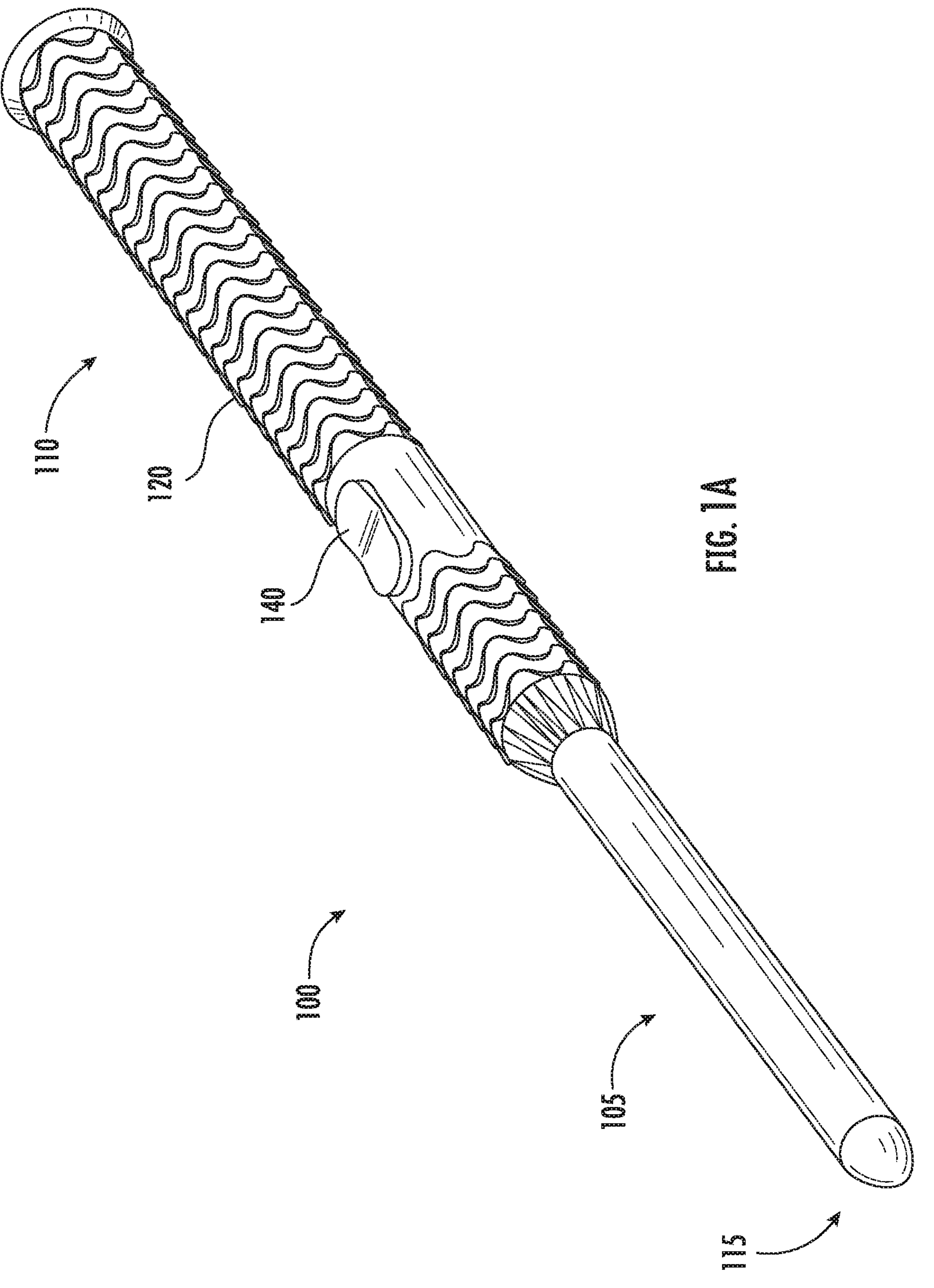
FIGS. 1A-E depict an example interactive object and an example hardware architecture of an interactive object according to example aspects of the present disclosure.

Example aspects of the present disclosure are directed to improved pairing of electronic devices such as an interactive toy and a user device. For example, a plurality of users may be located within the same room (e.g., of a store, etc.). Each user may have an interactive object. The interactive object can be, for example, a hand-held electronic smart wand with a hardware architecture that enables inter-device communications as well as motion sensing. The interactive object may be paired with a user device (e.g., a user's phone, etc.) to help extend the functionality of the interactive object by allowing it to leverage the computing resources of the user device. This can include, for example, gesture-recognition software running on the user device that can allow a user to perform an action (e.g., make a purchase, adjust user device volume, etc.) by making a particular gesture with the paired interactive object (e.g., a spell motion with the electronic smart wand, etc.). However, invalid or unwanted device pairing may arise in the event that multiple users are concurrently attempting to pair interactive objects with user devices within the same vicinity.

The technology of the present disclosure can help accurately pair an interactive object with a user device to avoid such confusion. For example, a user can initiate a pairing sequence by providing a user input to the interactive object (e.g., by squeezing the wand, pressing a button, etc.). The interactive object can detect the user input and, in response, generate a pairing communication to be sent to a user device. The pairing communication (e.g., a Bluetooth Low Energy (BLE) advertising packet, etc.) can include an interactive object identifier and data indicative of a pairing output signal that is emittable by the interactive object. The pairing output signal can be, for example, a light signal of a particular color and/or a sound associated with the interactive object. The pairing output signal may have visual/audio characteristics (e.g., a color, frequency, duration, melody, amplitude, etc.) that are unique to the interactive object. The interactive object can provide the pairing communication to the user device. The user device can process the pairing communication to identify the unique pairing output signal of the interactive object and activate a sensor of the user device that can be utilized for detecting this type of pairing output signal as it is emitted by the interactive object. Once the pairing output signal is detected, the user device can confirm that it has identified the correct interactive object (e.g., by matching the detected signal to the one identified in the pairing communication, etc.) and pair with the interactive object. In this way, the technology of the present disclosure improves the ability of a user device (and an interactive object) to accurately pair with one another, while helping to reduce the confusion, security vulnerably, and computational waste that arise from invalid/unwanted device pairing.

More particularly, an interactive object can be a hand-held electronic device that includes various hardware components. For instance, the interactive object can include a wand-like form factor. The wand-like form factor can include a generally cylindrical outer casing with a first end (e.g., including a wand tip, etc.) and a second end (e.g., including a wand handle, etc.). The generally cylindrical outer casing can include various diameters such that, for example, it is tapered from the second end to the first end. In some implementations, the interactive object may include another type of form-factor such as, for example, a spherical form-factor.

The outer casing of the interactive object can form a cavity, which can include various hardware components for performing the functions of the interactive object. The hardware components can include, for example: a sensor/device (e.g., inductive sensor, button, etc.) for detecting user input, an inertial measurement unit (e.g., accelerometer, gyroscope, etc.), haptic actuator (e.g., eccentric rotating mass (ERM) motor, etc.), communication interface (e.g., Bluetooth chip, antenna, etc.), microcontroller, power source (e.g., battery with associated charging hardware, etc.), output device(s) (e.g., LED/other lights, speakers, etc.), processor(s), memory, and/or other components. The hardware architecture of the interactive object can allow it to perform various functions including, for example, pairing with another device and making a gesture action, as further described herein.

To initiate a pairing process, a user of the interactive object can provide user input to the interactive object. For example, the user can provide a physical contact input to the interactive object (e.g., via a squeeze, button press, etc.). The interactive object can detect the user input via a sensor on the interactive object. This can include identifying the user input via an inductive sensor configured to detect a change in a magnetic field arising from a metal deformation caused by the user input. In another example, the user input can be detected by an inertial measurement unit or other sensor configured to detect movement of the interactive object.

The interactive object can generate a pairing communication for a user device. The pairing communication can include a radio wave advertising packet such as, for example, a BLE advertising packet to be provided to the user device. The pairing communication can include various information for pairing the interactive object to the user device. For instance, the pairing communication can include an interactive object identifier. The interactive object identifier can include a combination of one or more characters that is unique to the interactive object. The pairing communication can include data indicative of a pairing output signal that is emittable by the interactive object. The pairing output signal can be unique to the interactive object. For example, the pairing output signal can include a visual signal (e.g., light signal, etc.) and/or an audio signal (e.g., a sound, etc.) associated with the interactive object.

The pairing communication can indicate the characteristic(s) of the pairing output signal to help the user device detect the pairing output signal as it is emitted by the interactive object. For example, in the event the pairing output signal includes a visual signal (e.g., a light signal, etc.), the pairing communication can indicate one or more visual characteristics associated with the visual signal, such as a color, a frequency, a duration, a pattern, and/or other characteristic(s). In the event the pairing output signal includes an audio signal, the pairing communication can indicate one or more audio characteristics associated with the audio signal (e.g., a sound, etc.), such as a frequency, a pitch, a volume, a melody, an amplitude, and/or other characteristic(s). The characteristic(s) (and/or the combination thereof) can be unique to the particular interactive object. In some implementations, the pairing communication can indicate a sensor of the user device (e.g., a camera, a microphone, etc.) to be activated in order for the user device to accurately detect the pairing output signal of the interactive object.

The interactive object identifier and/or the pairing output signal can be static and/or determined in real-time. For example, the interactive object identifier and/or the pairing output signal can be static/fixed (e.g., assigned to the interactive object at manufacturing, etc.) and retrieved from a memory upon detection of the user input with the interactive object. Additionally, or alternatively, the interactive object identifier and/or the pairing output signal can be determined in at least near real-time by the interactive object (accounting for any computing latency), in response to detecting the user input with the interactive object.

The interactive object can provide the pairing communication to the user device. The user device can be associated with the user of the interactive object. For example, the user device can be a mobile phone, tablet, laptop, etc. of the user. The user device can analyze the pairing communication to determine how to pair with the interactive object. For example, in the event that the user device obtains only one pairing communication, the user device can pair with the interactive object associated with the interactive object identifier included in the pairing communication. In the event that the user device obtains a plurality of pairing communications, the user device can determine which interactive object it is to pair with based at least in part on the pairing output signal. For instance, the user device can analyze the pairing communication to determine which pairing output signal is emittable by a particular interactive object. This can be the unique pairing output signal associated with the interactive object and indicated in the pairing communication provided by the interactive object.

The user device can activate one or more of its sensors based at least in part on the pairing output signal indicated in the pairing communication. For example, the user device can process the advertising packets obtained from the plurality of interactive objects (e.g., within Bluetooth protocol communication range, etc.). The user device can generate a pairing data structure (e.g., a list, etc.) that identifies the various combinations of interactive object identifiers with their associated unique pairing output signals. The user device can be configured to activate one or more of its sensors based at least in part on the type(s) of pairing output signals included in the pairing data structure. For example, in the event that a pairing output signal includes a visual signal (e.g., a light signal, etc.), the user device can activate its visual sensor(s) (e.g., camera, etc.) that are capable of detecting the visual signal. Additionally, or alternatively, in the event that a pairing output signal includes an audio signal (e.g., a sound, etc.), the user device can activate its audio sensor(s) (e.g., microphone, etc.) that are capable of detecting the audio signal.

Using its activated sensor(s), the user device can detect a pairing output signal provided by the interactive object. More particularly, the interactive object can generate the pairing output signal via one or more output devices. For example, the interactive object can emit a light signal via one or more lighting elements of the interactive object (e.g., LED(s) located at the tip of the smart wand, etc.). The light signal can be emitted with the visual characteristic(s) that are unique to the interactive object and were indicated in the pairing communication. By way of example, the light signal can be emitted with a certain color at a certain flashing frequency and/or with a certain intensity. Additionally, or alternatively, the interactive object can emit a sound via one or more audio elements of the interactive object (e.g., speaker(s), etc.). The sound can be emitted with the audio characteristic(s) that are unique to the interactive object and were indicated in the pairing communication. By way of example, the interactive object can emit a sound with a certain pitch, melody, amplitude, patten, etc. that is unique to the interactive object. The user device can utilize its sensors to detect the pairing output signal emitted from the interactive object by obtaining sensor data indicative of the pairing output signal. The user device can analyze the sensor data to identify the particular pairing output signal based on the visual/audio characteristic(s) observed in the sensor data.

The user device and the interactive object can be paired based at least in part on the pairing communication and/or the pairing output signal. For example, the user device can utilize the detected pairing output signal to perform a look-up function in the pairing data structure. The user device can determine which interactive object identifier is associated with the pairing output signal detected by the user device. The user device can pair with the interactive object associated with that interactive object identifier.

Once paired, the interactive object can leverage the computing resources of the user device to perform one or more functions. For instance, the user can physically move the interactive object to perform an interactive object action. The interactive object action can include, for example, a gesture action. The gesture action can represent a spell-like motion associated with a wand. While in motion, the interactive object can obtain sensor data (e.g., via an IMU, etc.) that indicates the position(s) and time(s) associated with the motion of the interactive object. This data can be expressed as a series of coordinate point(s) (e.g., 2D x-y coordinates, etc.) and time(s) (e.g., time durations from a t0, timestamps associated with a world clock, etc.). The interactive object can provide data indicative of the interactive object action (e.g., the coordinates/times associated with the gesture action, etc.) to the user device.

The user device can perform one or more user device actions based at least in part on the interactive object action. For instance, the user device can obtain the data indicative of the interactive object action. The user device can process the data to identify the interactive object action and an associated user device action to be performed. By way of example, the user device can input the coordinates/times associated with the gesture action into a recognizer model. The recognizer model can be configured to analyze the coordinates/times to identify the particular interactive object action performed via the interactive object. The recognizer model can output data indicative of the identified interactive object action. The user device (e.g., a software application running on the device, etc.) can determine a user device action to perform based at least in part on the interactive object action identified by the recognizer model. By way of example, the user device can perform a look-up function to determine what action the user device is to take in response to the interactive object action. This can include, for example, adjusting the volume of the user device, purchasing an item via an e-commerce application, activating a lighting source of the user device, capturing an image, initiating a communication (e.g., phone call, telephone call, etc.), emitting sound(s), sending a communication to adjust a parameter of another device (e.g., tuning on a home device, changing the channel of a smart television, etc.), opening an email application and reading an unread email, and/or other types of functions. In this way, the user can effectively pair the interactive object and the user device to extend the functions and capabilities of the interactive object and the actions associated therewith.

The present disclosure provides a number of technical effects and benefits. For example, the disclosed technology can provide a combination of pairing communication and pairing output signals that are unique to a particular device. As a result, the technology of the present disclosure can improve the likelihood that one device (e.g., an interactive object, etc.) is properly paired with another, intended device (e.g., a user device, etc.). In doing so, the present disclosure helps avoid the unwanted and/or invalid pairing of a device with another, unintended device. This can help save the computational resources (e.g., processing, memory, power, etc.) that would be wasted by unpairing the devices and re-attempting a correct pair sequence. Moreover, the pairing techniques of the present disclosure can improve computing/device security by increasing the likelihood that a device is paired with another intended, device rather than an unknown device (e.g., of another user, etc.). For example, if a user device detects a pairing output signal (e.g., of a different color, etc.) from an interactive object that has not provided a pairing communication (or vice versa), the user device will know not to pair with that interactive object. Accordingly, the technology of the present disclosure provides effective, computationally efficient, and secure pairing processes, systems, and devices.

FIGS. 1A-E depict an example interactive object and an example hardware architecture of an interactive object according to example aspects of the present disclosure. For example, FIG. 1A depicts an example interactive object 100. The interactive object 100 can be a hand-held electronic device. The interactive object 100 can be an interactive toy (e.g., an electronic smart wand toy, etc.). For instance, the interactive object 100 can include a wand-like form factor. The wand-like form factor can include a generally cylindrical shape. In some implementations, the wand-like form factor of the interactive object 100 can include one or more other shapes (e.g., square, rectangular, hexagonal, octagonal, etc.). In some implementations, the interactive object 100 may include another type of form-factor such as, for example, a spherical form-factor. The interactive object 100 (and its portions/elements) can be constructed from one or more materials including, for example, polymers, metal, wood, composites, and/or one or more other materials.

The interactive object 100 can include a plurality of portions. For example, the interactive object 100 can include a first end/portion 105 and a second end/portion 110. The first end/portion 105 can include, for example, a tip 115 (e.g., a tip of the wand, etc.). The second end/portion 110 can include a handle 120 (e.g., a wand handle, etc.). In some implementations, the handle 120 can include a material suitable for securing or comforting the grip of a user (e.g., rubber, polymer, rigged surface, padding, etc.).

Figures 1B, 1C:
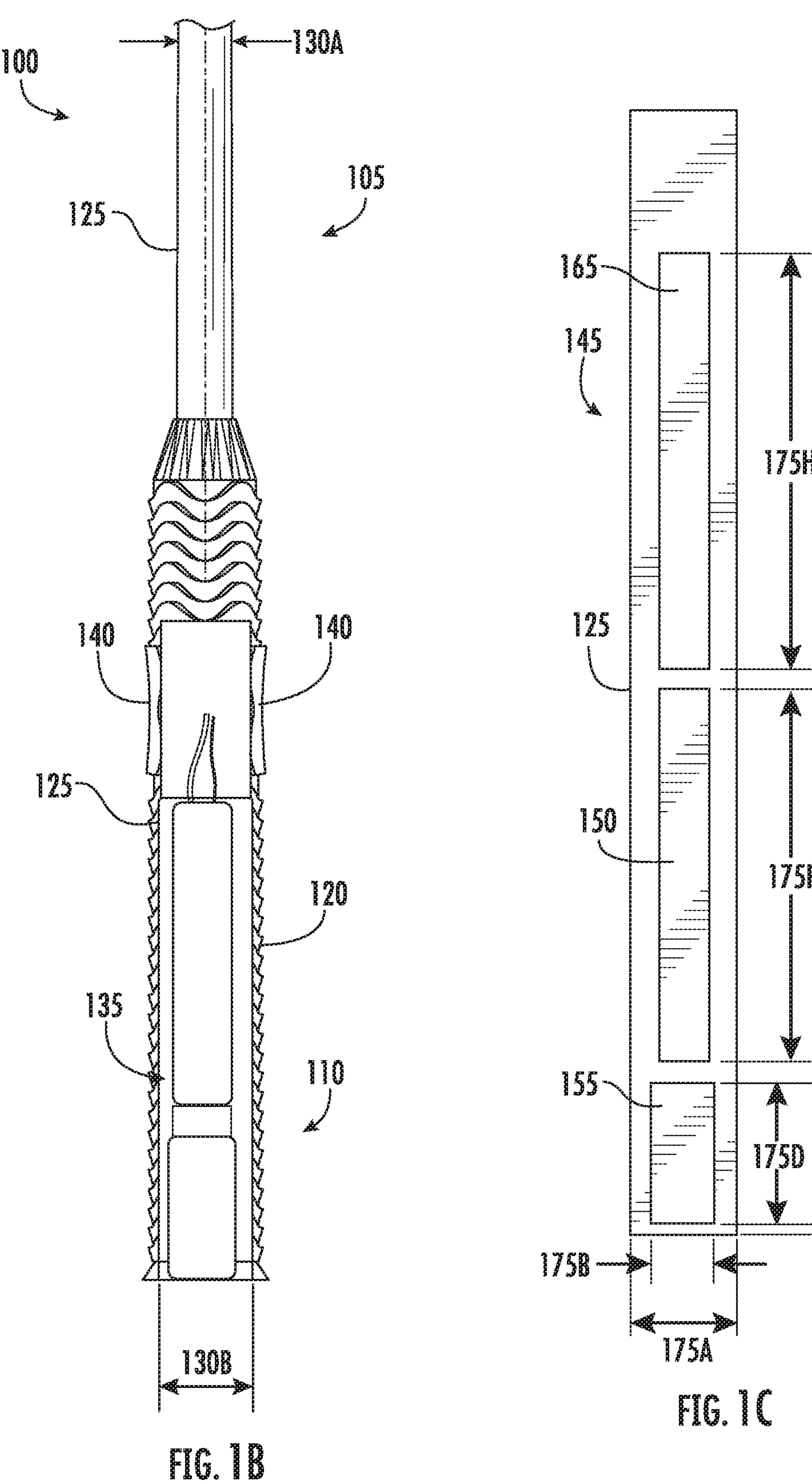

With reference to FIG. 1B, the interactive object 100 can include an outer casing 125 (e.g., an outer shell, layer, etc.) with an outer surface. In some implementations, at least a portion of the outer casing 125 can be covered by another material. This can include, for example, a grip/comfort material of the handle 120. The outer casing 125 can include one or more diameters/widths 130A-B. For example, the first end/portion 105 can be associated with one or more first diameters 130A (e.g., 10-30 mm, etc.). The second end/portion 110 can be associated with one or more second diameters 130B (e.g., 3-20 mm, etc.). The first diameter(s) 130A can be smaller than the second diameter(s) 130B. This can allow, for example, the interactive object 100 to appear tapered from the second end/portion 110 to the first end/portion 105.

In some implementations, the interactive object 100 can include one or more devices for obtaining user input. For instance, the interactive object 100 can include a user input sensor 135. The user input sensor 135 can be disposed proximate to the second end/portion 110 (e.g., closer to the second end 110 than the first end 105, etc.). For example, the user input sensor 135 can be disposed within a cavity formed by the outer casing 125 and within/under the handle 120. The user input sensor 135 can include an inductive sensor. The inductive sensor can include a coil with a metal casing surrounding the coil. The coil can be configured to detect a change in a magnetic field arising from a deformation of the metal casing. Such a deformation can be caused, for example, by a user input (e.g., a user physically gripping the handle 120 of the interactive object 110, etc.). Additionally, or alternatively, the interactive object 100 can include one or more interactive elements 140. This can include, for example, one or more buttons, touchpads, light sensors, heat sensors, and/or other features that a user can physically contact to provide user input.

Figure 1D:
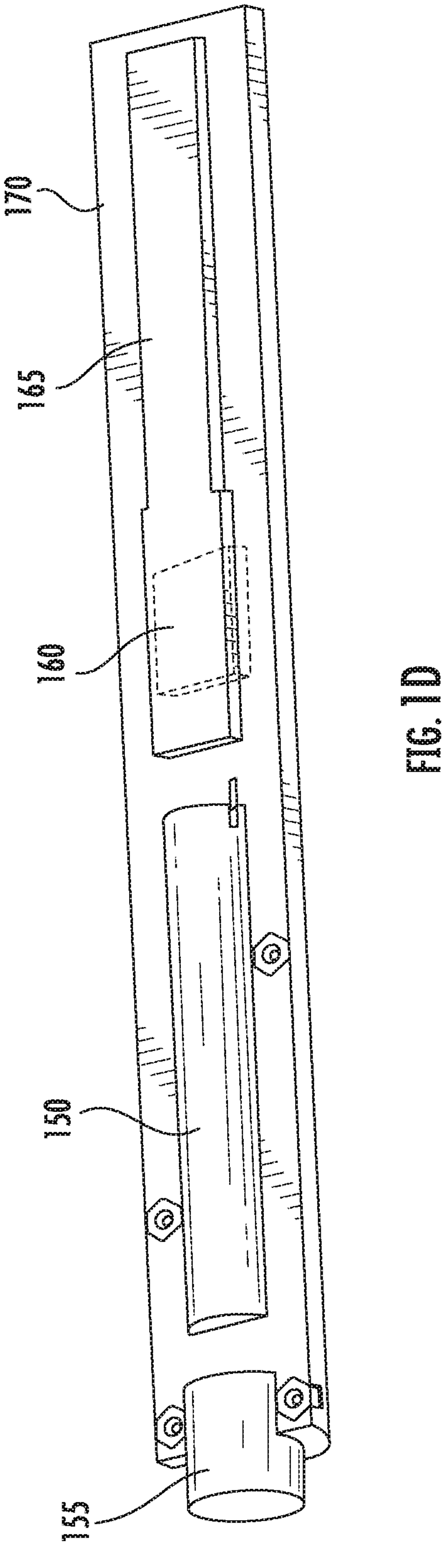

With reference to FIGS. 1C and 1D, the interactive object 100 can include a cavity 145. The cavity 145 can be an interior cavity of the interactive object 100 formed by the outer casing 125. Various hardware components for performing the functions of the interactive object 100 can be disposed within the cavity 145. The interactive object 100 can include a power source 150 with an associated charging/fueling infrastructure 155. For example, the power source 150 can include one or more batteries (e.g., lithium-ion batteries, lithium-ion polymer batteries, and/or other batteries) and the charging/fueling infrastructure 155 can include wired and/or wireless (e.g., inductive, etc.) charging hardware. In some implementations, the interactive object 100 can include a haptic actuator 160 (shown in FIG. 1D) and a printed circuit board 165. The haptic actuator 160 can be configured to provide haptic feedback (e.g., vibration, etc.) to a user of the interactive object 100. As shown in FIG. 1D, various hardware components can be secured to/within the interactive object 100 via a support structure 170. The support structure 170 can include a mechanical spine or other structural element to which the various hardware components can be affixed. The support structure 170 can be affixed to the outer casing 125 (e.g., an interior surface thereof, etc.). In some implementations, the support structure 170 can be temporarily affixed so that it can be removed for maintenance, replacement, update, etc. of the various hardware components.

As shown in FIG. 1C, the cavity 145 and the various hardware components can include various dimensions 175A-H. For example, the cavity 145 can include a width/diameter with a first dimension 175A (e.g., 2-25 mm, etc.). This can represent the distance from one side of the interior surface of the outer casing 125 to another. The charging/fueling infrastructure 155 can include a width with a second dimension 175B (e.g., 3-15 mm, etc.), can be spaced from an end of the cavity 145 by a third dimension 175C (e.g., 0.5-3 mm, etc.), and can have a length of a fourth dimension 175D (e.g., 10-30 mm, etc.). The power source 150 can be spaced apart from the charging/fueling infrastructure by a fifth dimension 175E (e.g., 0.5-7 mm, etc.) and have a length of a sixth dimension 175F (e.g., 30-70 mm, etc.). The printed circuit board 165 can be spaced apart from the power source 150 by a sixth dimension 175G (e.g., 0.5-7 mm, etc.) and have a length of a seventh dimension 175H (e.g., 30-70 mm, etc.).

Figure 1E:
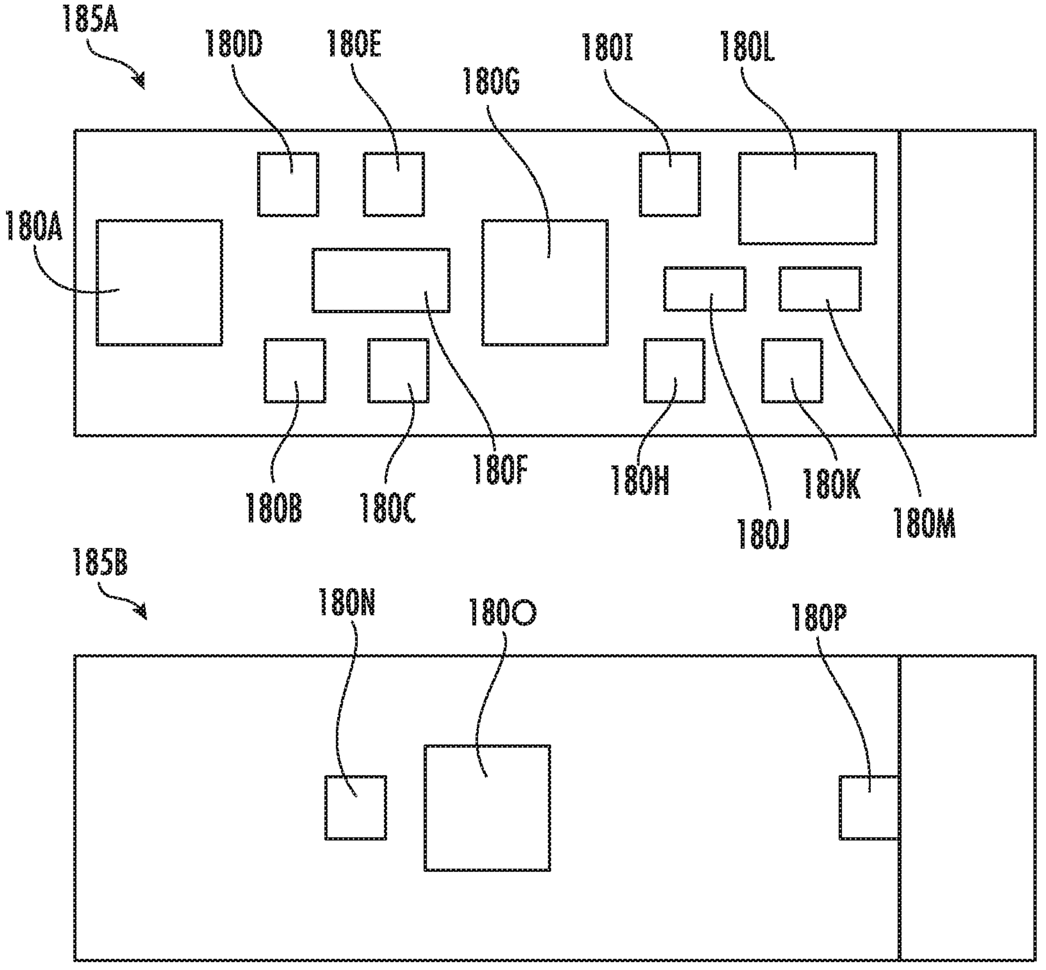

FIG. 1E depicts another diagram of example hardware components 180A-P that can be included in the interactive object 100. The hardware components 180A-P can be disposed across various layers 185A-B (e.g., top layer, bottom layer, etc.). For example, the hardware components 180A-P can include, for example: charging/fueling infrastructure 180A (e.g., as described herein, etc.); device(s) 180B/K for detecting user input (e.g., inductive/other sensor(s), button(s), etc.); one or more output device(s) 180C (e.g., LED/other lights, speakers, ultrasound receiver/emitter, infrared emitter, etc.) and associated hardware 180P (e.g., connector(s), etc.); a gauge 180D configured to indicate a level of power of the interactive device 100; power management integrated circuit(s) 180E configured to manage the power of the interactive device 100; a power source 180F (e.g., as described herein, etc.); microcontroller(s) 180G; an inertial measurement unit 180H (e.g., accelerometer, gyroscope, etc.); haptic actuator 180I (e.g., eccentric rotating mass (ERM) motor, etc.) and associated actuator hardware 180N (e.g., connector(s), etc.); memory 180J (e.g., nonvolatile memory chip, flash memory, etc.); a communication interface 180I (e.g., antenna, etc.) and associated computing hardware 180L (e.g., BLE chip, etc.); processor(s) 1800; and/or other components. In some implementations, the output device(s) 180C can be configured to output signals from the first end/portion 105 (e.g., the tip 115, etc.) of the interactive object 100 to the external environment of the interactive object 100.

Figure 2:
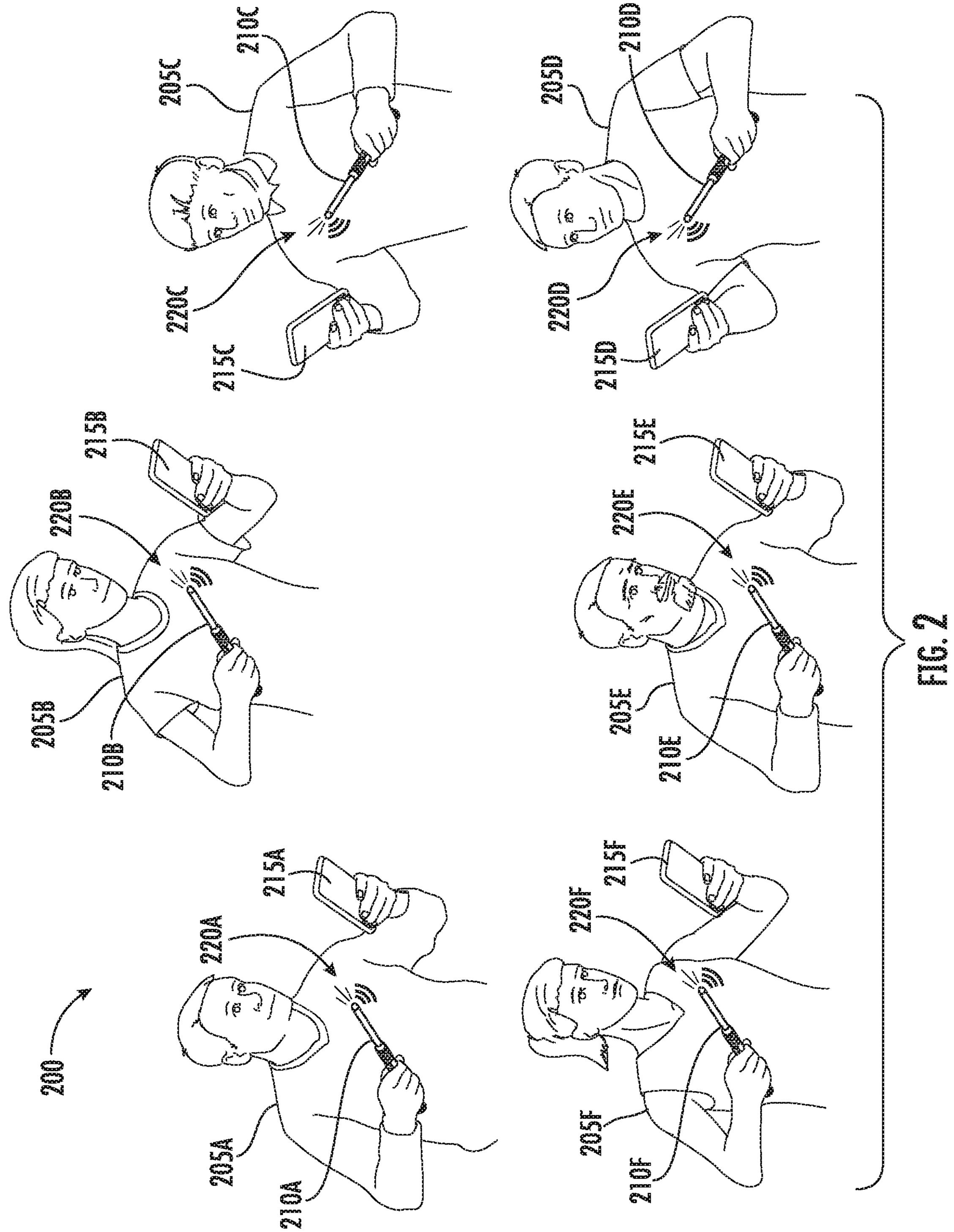
FIG. 2 depicts an example interactive object and user device ecosystem according to example aspects of the present disclosure.

The hardware architecture/components can allow the interactive object 100 to pair with another electronic device. For example, FIG. 2 depicts an example interactive object and user device ecosystem according to example aspects of the present disclosure. For example, a plurality of users 205A-F may be located within the same vicinity (e.g., room, space, etc. of a building, house, etc.). Each user 205A-F can be associated with a respective interactive object of a plurality of interactive objects 210A-F. For instance, a first user 205A can be associated with a first interactive object 210A, a second user 205B can be associated with a second interactive object 210B, and so on. The respective interactive object 210A-F associated with a user 205A-F can be the interactive object purchased, owned, registered to, controlled by, utilized by, held by, indicated a profile of, etc. the user 205A-F. The interactive objects 210A-F can be, for example, an interactive object as described herein with reference to FIGS. 1A-E.

Each user 205A-F can be associated with a respective user device of a plurality of user devices 215A-F in the ecosystem 200. The user devices 215A-F can include a phone (e.g., mobile phone, etc.), tablet, laptop, etc. The user device 215A-F can be purchased, owned, registered to, controlled by, utilized by, held by, nearby, etc. the user 205A-F. For instance, a first user 205A can be associated with a first user device 215A, a second user 205B can be associated with a second user device 215B, and so on.

An interactive object 210A-F can be paired with a user device 215A-F (associated with a user 205A-F) to help extend the functionality of the interactive object 210A-F. This can include, for example, gesture-recognition software running on the user device 215A-F that can allow a user 205A-F to perform an action (e.g., make a purchase, adjust user device volume, etc.) by making a particular gesture with the paired interactive object 210A-F (e.g., a motion indicative of a "spell" of the interactive toy wand, etc.).

To initiate a pairing process, a user 205A-F of an interactive object 210A-F can provide user input to the interactive object 210A-F. For example, the user 205A-F can provide a physical contact input to the interactive object 210A-F (e.g., via a squeeze, button press, triggering a heat/light sensor, etc.). In some implementations, the user input can include an audio signal (e.g., voice command, etc.). The interactive object 210A-F can detect user input associated with the interactive object 210A-F (e.g., a physical contact with the interactive object 210A-F, etc.). This can include identifying the user input via a sensor (e.g., an inductive/heat/motion/light sensor, button, microphone, etc.) configured to sense the user input when the user 205A-F contacts or other interacts with the interactive device 210A-F (e.g., by detecting a change in a magnetic field arising from a metal deformation around a coil, by detecting a physical manipulation of a button, etc.). In another example, the user input can be detected by an inertial measurement unit or other sensor configured to detect movement of the interactive object 210A-F.

The interactive object 210A-F can generate a pairing communication based at least in part on the user input. The pairing communication can be a radio wave advertising packet. This can include, for example, a BLE advertising packet to be provided to a user device 215A-F associated with the user 205A-F of the interactive object 210A-F. The pairing communication can include various information for pairing the interactive object 210A-F to the user device 215A-F. For instance, the pairing communication can include an interactive object identifier and data indicative of a pairing output signal that is emittable by the interactive object.

FIG. 3 depicts an example contents of a pairing communication 300 according to example aspects of the present disclosure. For instance, as shown, the pairing communication 300 can include an interactive object identifier (e.g., in the BLE packet payload, etc.). The interactive object identifier can include a combination of one or more characters that is unique to the interactive object 210A-F. This can include, for example, a serial number of the interactive object 100.

The pairing communication 300 can include data indicative of a pairing output signal that is emittable by the interactive object 210A-F. The pairing output signal can be unique to the interactive object 210A-F. For example, the pairing output signal can include a visual signal (e.g., light signal, etc.) and/or an audio signal (e.g., a sound, etc.) associated with the interactive object 210A-F. The pairing communication 300 can indicate the characteristic(s) of the pairing output signal to help the user device 215A-F detect the pairing output signal as it is emitted by the interactive object 210A-F. For example, in the event the pairing output signal includes a visual signal (e.g., a light signal, etc.), the pairing communication 300 can indicate one or more visual characteristics associated with the visual signal. The data indicative of the pairing output signal can be indicative of a color of the visual signal. The data indicative of the pairing output signal can be indicative of one or more timing characteristics of the visual signal. This can include, for example, a frequency of the visual signal, a duration of the visual signal, a pattern of the visual signal, and/or other characteristic(s) of the visual signal. In the event the pairing output signal includes an audio signal, the pairing communication can also, or alternatively, indicate one or more audio characteristics associated with the audio signal (e.g., a sound, etc.), such as a frequency, a pitch, a volume, a melody, an amplitude, a duration, and/or other characteristic(s). The characteristic(s) (and/or the combination thereof) can be unique to the particular interactive object 210A-F. In some implementations, the pairing output signal can include an ultrasound/ultrasonic emission, infrared signal, and/or other types of audio and/or visual signals.

In some implementations, the pairing communication 300 can indicate a sensor of the user device 215A-F to be activated in order for the user device 215A-F to accurately detect the pairing output signal of the interactive object. For example, in the event the pairing output signal includes a visual signal, the pairing communication 300 can indicate that the user device 215A-F is to activate a camera and/or another imaging device. Additionally, or alternatively, in the event the pairing output signal includes an audio signal, the pairing communication 300 can indicate that the user device 215A-F is to activate a microphone and/or another audio signal capture device.

The interactive object identifier and/or the pairing output signal can be static and/or determined in real-time. For example, the interactive object identifier and/or the pairing output signal can be static/fixed (e.g., assigned to the interactive object at manufacturing, registration, purchase, shipment, etc.) and retrieved from a memory upon detection of the user input with the interactive object 210A-F. Additionally, or alternatively, the interactive object identifier and/or the pairing output signal can be determined in at least near real-time by the interactive object 210A-F (e.g., accounting for any computing latency), in response to detecting the user input with the interactive object 210A-F. For example, the interactive object 210A-F can be configured to generate the interactive object identifier and/or select a pairing output signal (e.g., the type and/or characteristic(s) thereof, etc.) based at least in part on the user input (e.g., upon detection of a squeeze, detecting a button compression, etc.).

Returning to FIG. 2, an interactive object 210A-F can provide a pairing communication 300 to a user device 215A-F. The user device 215A-F can obtain the pairing communication 300 from the interactive object 210A-F. As described herein, the user device 215A-F can be associated with the user 205A-F of the interactive object 210A-F. The user device 215A-F can analyze the pairing communication 300 to determine how to pair with the interactive object 210A-F that provided the pairing communication 300. In some implementations, the user device 215A-F may only obtain one pairing communication 300. The user device 215A-F can pair with the interactive object 210A-F associated with the interactive object identifier included in the single pairing communication 300.

In some implementations, the user device 215A-F can obtain a plurality of pairing communications 300. The user device 215A-F can determine which interactive object 210A-F it is to pair with based at least in part on the pairing output signal. For instance, the user device 215A-F can determine a pairing output signal that is emittable by the interactive object 210A-F based at least in part on the pairing communication 300 from the respective interactive object 210A-F. The pairing output signal can by emittable by the respective interactive object 210A-F for pairing with the user device 215A-F. This can be the unique pairing output signal associated with the respective interactive object 210A-F and indicated in the pairing communication 300 provided by the interactive object 210A-F.

To help determine the appropriate interactive object 210A-F with which to pair, the user device 215A-F can generate a pairing data structure (e.g., a list, table, tree, etc.) that identifies the various combinations of interactive object identifiers with their associated unique pairing output signals. FIG. 4 depicts an example pairing data structure 400 of a user device according to example aspects of the present disclosure. The data structure 400 can be include data entry field(s) for each of the received pairing communications 300. For example, a first user device 215A can obtain a pairing communication 300 from each of a first interactive object 210A, a second interactive object 210B, a third interactive object 210C, and a fourth interactive object 210D. The first user device 215A can generate a data entry (e.g., a row of data fields, etc.) for each pairing communication from each interactive device. Each respective data entry can indicate the interactive object identifier as well as the pairing output signal (and any indicated audio/visual characteristics thereof) associated with the respective interactive object 210A-D. If provided in the pairing communication 300, the data entry can also indicate a sensor to be activated by the first user device 215A in order to detect the pairing output signal of the transmitting interactive object.

In some implementations, the pairing data structure 400 can include time(s) associated with the pairing communication(s) received from the interactive objects. The time(s) can be indicative of a time the pairing communication was received, a release/expiration time/amount at which the user device can disregard the pairing communication, a time expired since the pairing communication was received, etc. To the extent the pairing communication was received at a time beyond a time threshold, the user device can disregard the pairing communication (e.g., delete the associated data entry, etc.). In some implementations, the user device can de-activate one or more sensor(s) that may be used to detect a pairing output signal indicated in the disregarded pairing communication (e.g., in the event those sensor(s) are not needed for a different detection, etc.).

The first user device 215A can determine a pairing output signal that is emittable by an interactive object 210A-F based at least in part on the pairing communication 300 from the interactive object 210A-F. For example, the first user device 215A can determine at least one of a color associated with the pairing output signal or a sound associated with the pairing output signal based at least in part on the pairing communication 300. This can include identifying which pairing output signal(s) the first user device 215A is to look for based at least in part on the pairing data structure 400. Additionally, or alternatively, the first user device 215A can determine at least one of one or more visual characteristics of the pairing output signal or one or more audio characteristics of the pairing output signal based at least in part on the pairing communication(s). This can include identifying such characteristic(s) using the pairing data structure 400.

Returning to FIG. 2, the user device 215A-F can activate one or more sensors of the user device 215A-F based at least in part on the pairing output signal indicated in the pairing communication 300. For example, the user device 215A-F can process the radio wave advertising packets obtained from the plurality of interactive objects 210A-F (e.g., within Bluetooth protocol communication range, etc.). The user device 215A-F can be configured to activate one or more of its sensors based at least in part on the type(s) of pairing output signals included in the pairing data structure 400. For example, a pairing output signal (indicated in the pairing communication 300) can include a visual signal (e.g., a light signal, etc.). The user device 215A-F can activate a camera of the user device and/or other visual sensor(s) that are capable of detecting the visual signal. Additionally, or alternatively, the pairing output signal (indicated in the pairing communication 300) can include an audio signal (e.g., a sound, etc.). The user device 215A-F can activate a microphone of the user device 215A-F and/or other audio sensor(s) (e.g., microphone, etc.) that are capable of detecting the audio signal. The user device 215A-F can also, or alternatively, activate sensor(s) of the user device 215A-F based at least in part on sensor(s) indicated in the pairing communication(s) 300 obtained by the user device 215A-F.

The user device 215A-F can detect, via the one or more sensors of the user device 215A-F, a pairing output signal 220A-F from an interactive object 210A-F. An interactive object 210A-F can generate a pairing output signal 220A-F via one or more output devices of the interactive object 210A-F. The pairing output signal 220A-F can include at least one of a visual signal or an audio signal of the interactive object 210A-F. For example, the data indicative of the pairing output signal (in the pairing communication 300) can be indicative of a color of the visual signal. The interactive object 210A-F can emit a light signal of the color via one or more lighting elements of the interactive object (e.g., LED(s) located at the tip of the interactive object 210A-F, etc.). The light signal can be emitted with the visual characteristic(s) that are unique to the interactive object 210A-F and were indicated in the pairing communication 300. By way of example, the data indicative of the pairing output signal (in the pairing communication 300) can be indicative of one or more timing characteristics of the visual signal. The interactive object 210A-F can generate a light signal in accordance with one or more timing characteristics. This can include, for example, the light signal being emitted at a certain flashing frequency, with a certain intensity, for a certain duration, etc.

Additionally, or alternatively, the interactive object 210A-F can emit an audio signal (e.g., a sound, etc.) via one or more audio elements of the interactive object (e.g., speaker(s), etc.). The audio signal can be emitted with the audio characteristic(s) that are unique to the interactive object 210A-F and were indicated in the pairing communication 300. By way of example, the interactive object 210A-F can emit a sound with a certain pitch, melody, amplitude, patten, frequency, duration, etc. that is unique to the interactive object 210A-F. The user device 215A-F can utilize its sensors to detect the pairing output signal 220A-F emitted from the interactive object 210A-F by obtaining sensor data indicative of the pairing output signal 220A-F. The user device 215A-F can analyze the sensor data to identify the particular pairing output signal 220A-F based on the visual/audio characteristic(s) observed in the sensor data. For example, the user device 215A-F can include (and/or otherwise access) image and/or sound processing algorithm(s)/model(s) configured/trained to ingest the sensor data and identify a pattern in the image pixel(s) or sound wave(s) (over one or more times). The algorithm(s)/model(s) can be configured to output data indicative of the visual and/or audio signals, which the user device 215A-F can then use to identify an interactive object 210A-F.

The user device 215A-F and the interactive object 210A-F can be paired based at least in part on the pairing communication 300 and/or the pairing output signal 220A-F. For example, a first user device 215A can utilize the detected pairing output signal 220A of a first interactive object 210A to perform a look-up function in the pairing data structure 400. The first user device 215A can determine which interactive object identifier is associated with the pairing output signal 220A detected by the first user device 215A. The first user device 215A can pair with the interactive object 210A associated with the determined interactive object identifier.

This pairing process can allow each user device 215A-F to pair with the appropriate interactive object 210A-F associated with the same user 205A-F of the user device 215A-F. This can include: a first user device 215A of a first user 205A pairing with a first interactive object 210A; a second user device 215B of a second user 205B pairing with a second interactive object 210B; a third user device 215C of a third user 205C pairing with a third interactive object 210C; a fourth user device 215D of a fourth user 205D pairing with a fourth interactive object 210D; a fifth user device 215E of a fifth user 205E pairing with a fifth interactive object 210E; a sixth user device 215F of a sixth user 205F pairing with a sixth interactive object 210F, etc.

Figure 5:
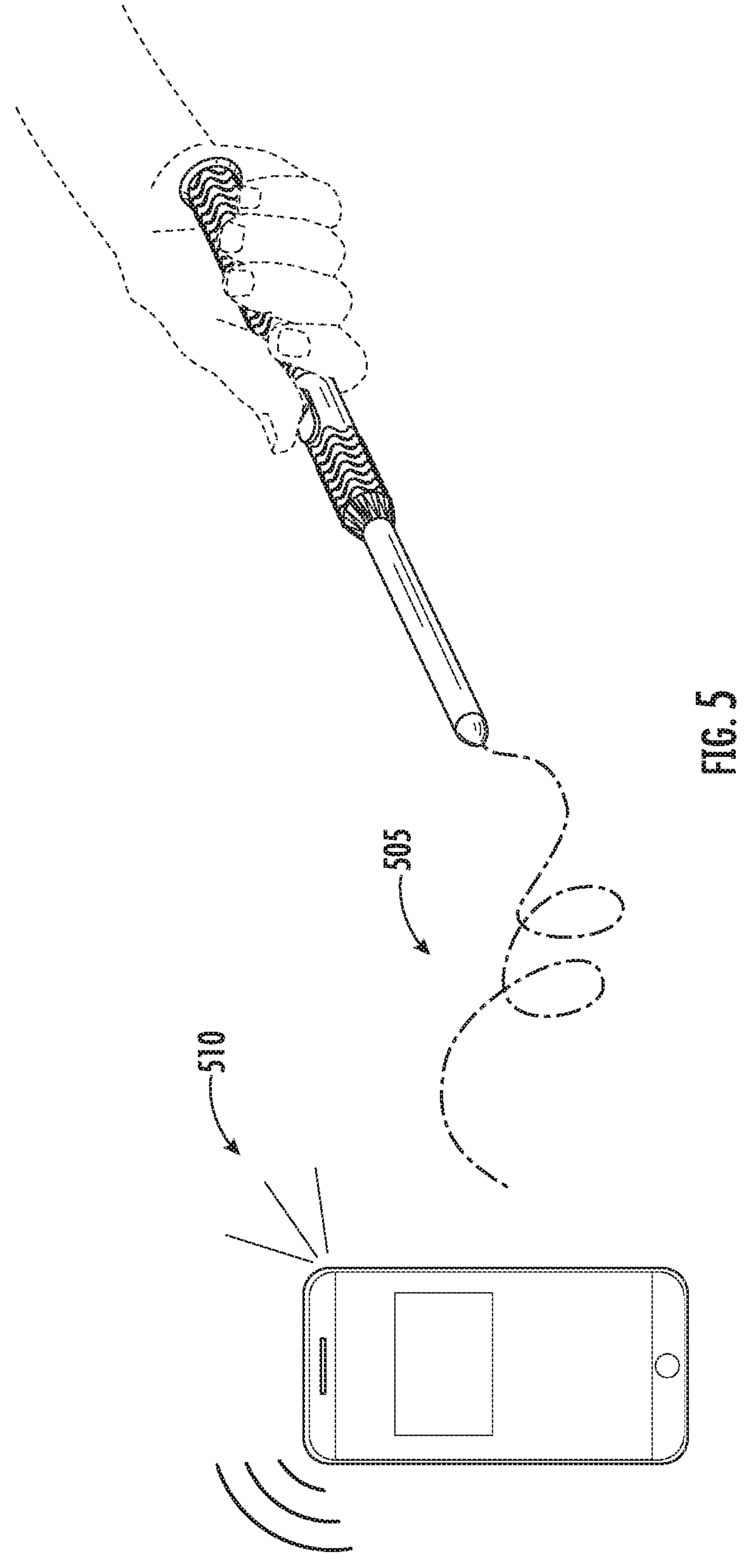
FIG. 5 depicts an example interactive object action according to example aspects of the present disclosure.

An interactive object 210A-F can communicate with the user device 215A-F with which it is paired, to perform one or more functions. This can include, for example, one or more actions. FIG. 5 depicts an example interactive object action 505 according to example aspects of the present disclosure. For instance, a user can physically move an interactive object to perform an interactive object action 505. The interactive object action 505 can include, for example, a gesture action. The gesture action can represent a spell-like motion associated with an interactive toy wand. While in motion, the interactive object can obtain sensor data (e.g., via the inertial measurement unit(s) of the interactive object, etc.) that indicates the position(s) and/or time(s) associated with the motion of the interactive object. In some implementations, this data can be expressed as a series of coordinate point(s) (e.g., 2D x-y coordinates, 3D x-y-z coordinates, etc.) and time(s) (e.g., time durations from a to, timestamps associated with a world clock, etc.). The interactive object can provide, to the user device, data indicative of the interactive object action 505. This can include, for example, the coordinates and/or times associated with the gesture action, etc.

The user device can perform a user device action 510 based at least in part on the interactive object action. For instance, the user device can obtain the data indicative of the interactive object action (e.g., the gesture action, etc.). The user device can process the data to identify the interactive object action 505 and an associated user device action to be performed. By way of example, the user device can input the coordinates/times associated with the gesture action into a recognizer model. The recognizer model can be configured to analyze the coordinates/times to identify the particular interactive object action 505 performed via the interactive object. For example, the data input into the recognizer model can be indicative of three-dimensional motion data generated by the interactive object (e.g., X-Y-Z coordinate data, with associated times, etc.). The recognizer model can be configured to flatten the three-dimensional coordinates into a two-dimensional representation (e.g., by viewing the sequence via a common view plane, etc.). The two-dimensional representation can then be matched to a stored gesture in a motion library (e.g., to identify a particular gesture within a particular confidence range, etc.) to determine an interactive object action (e.g., a gesture, etc.) intended by the user. The recognizer model can output data indicative of the identified interactive object action.

In some implementations, one or more of these functions can be performed by the interactive object. For example, the interactive object can include, access, and/or otherwise exploit the recognizer model using its hardware. The interactive object can determine an interactive object action based at least in part on the recognizer model and the data indicative of the interactive object action 505. For example, the interactive object can input the data indicative of the interactive object action 505 into the recognizer model, which can analyze the data and provide an output indicating which interactive object action 505 was performed by the interactive object. In some implementations, the interactive object can provide this data (or a processed version thereof) to the user device.

The user device (e.g., a software application running on the device, etc.) can initiate and/or perform a user device action 510 based at least in part on the interactive object action 505 identified by the recognizer model. By way of example, the user device can perform a look-up function to determine what action the user device is to take in response to the interactive object action 505. This can include, for example, opening an application of the user device, adjusting the volume of the user device, purchasing an item via an e-commerce application, activating a lighting source of the user device, capturing an image, initiating a communication (e.g., phone call, telephone call, etc.), emitting sound(s), sending a communication to adjust a parameter of another device (e.g., turning on a home device, changing the channel of a smart television, etc.), opening an email application and reading an unread email, and/or other types of functions.

Figure 6:
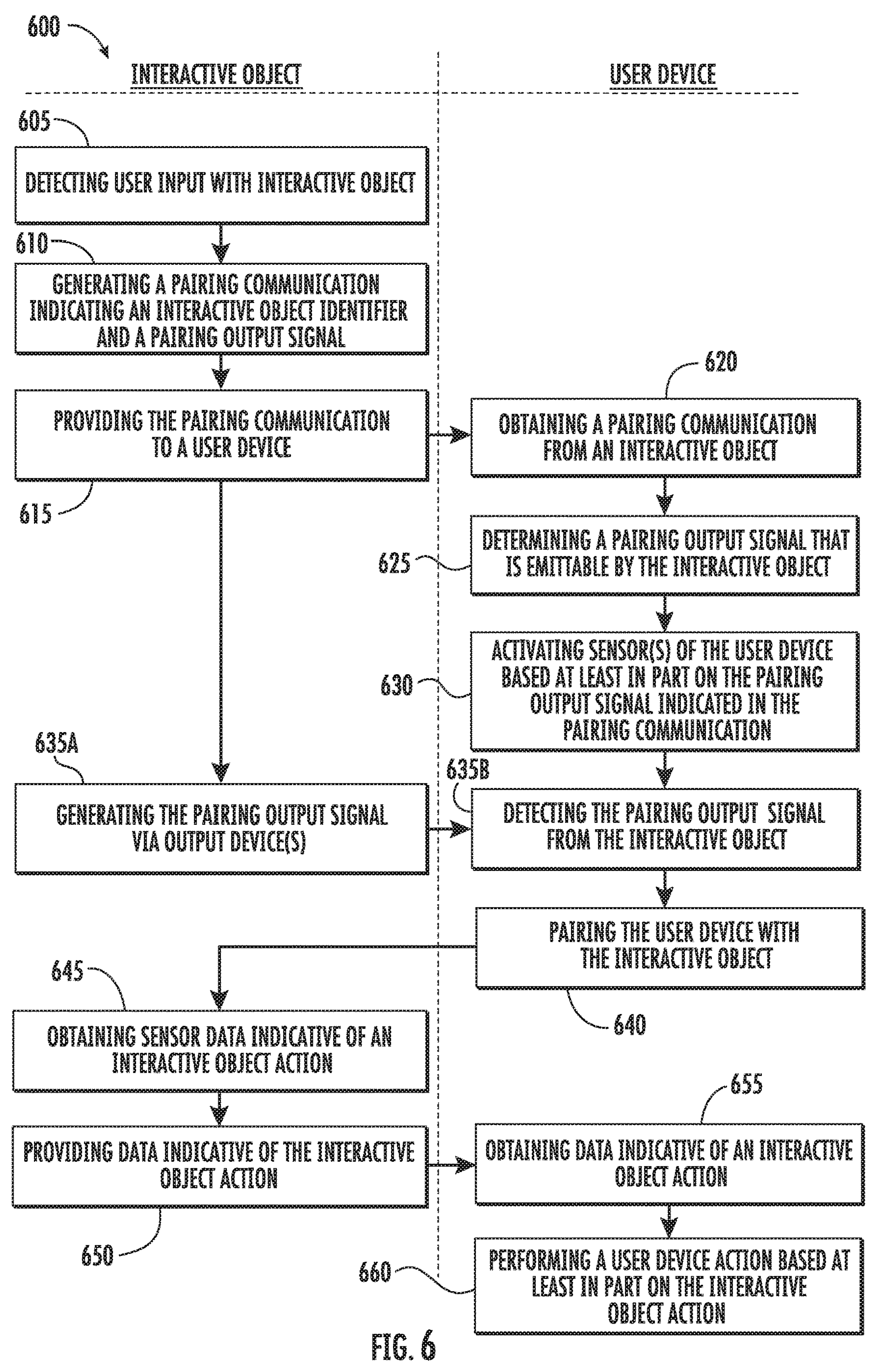
FIG. 6 depicts an example method for pairing devices according to example aspects of the present disclosure.

FIG. 6 depicts an example method 600 for pairing devices according to example aspects of the present disclosure. One or more portion(s) of method 600 can be implemented by one or more computing device(s) such as, for example, those shown in FIGS. 1, 2, 5, and 7. Moreover, one or more portion(s) of the method 600 can be implemented as an algorithm on the hardware components of the device(s) described herein (e.g., as in FIGS. 1, 2, 5, and 7) to, for example, pair electronic devices. FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (605), the method 600 can include detecting user input with an interactive object. For instance, an interactive object (e.g., interactive object 100, 210A-F, etc.) can detect user input with the interactive object. As described herein, the interactive object can include a wand-like form factor. The user input can be detected via one or more elements of the interactive object such as, for example, an inductive sensor, a button, a touch pad, heat sensor, etc. when the user interacts with the element(s) (e.g., triggering an inductive sensor reading, changing a button state, contacting a touch pad, triggering a heat signature reading, etc.).

At (610), the method 600 can include generating a pairing communication indicting an interactive object identified and a pairing output signal. For instance, in response to detecting the user input, the interactive object can generate a pairing communication for a user device. The pairing communication can include a radio wave advertising packet (e.g., a BLE advertising packet, etc.). The pairing communication can include an interactive object identifier and data indicative of a pairing output signal that is emittable by the interactive object. The interactive object identifier and the pairing output signal can be unique to the interactive device, at least among a plurality of interactive objects within the current ecosystem of the interactive device. The plurality of interactive objects can be within a vicinity, within a communication range, within a threshold distance (e.g., 50, 100, 200, 500 ft., etc.), within a geographic area, etc. of one another. The interactive object identifier can be, for example, a serial number associated with the interactive object.

In some implementations, the pairing output signal can include a visual signal. The visual signal can include a light signal (e.g., emittable via an LED located at a wand tip, etc.). The data indicative of the pairing output signal (included in the pairing communication) can be indicative of one or more visual characteristics associated with the light signal. The one or more visual characteristics can include a color of the light signal. Additionally, or alternatively, the one or more visual characteristics can include at least one of a frequency of the light signal, a duration of the light signal, a pattern associated with the light signal, and/or other characteristic(s).

In some implementations, the pairing output signal can include an audio signal. The audio signal can include a sound. The data indicative of the pairing output signal can be indicative of one or more audio characteristics associated with the audio signal. The one or more audio characteristics can include at least one of a frequency of the sound, a pitch of the sound, a volume of the sound, an amplitude of the sound, and/or other characteristic(s).

At (615), the method 600 can include providing the pairing communication to a user device. For instance, the interactive object can provide the pairing communication to the user device (e.g., a user device 215A-F, etc.). As described herein, the user device and the interactive object can be associated with the same user (e.g., that provides user input to the interactive device, etc.). The user device can include a mobile phone. The interactive object can provide the pairing communication to the user device utilizing a communication protocol (e.g., BLE, Zigbee, other short/near range communication protocols, etc.). The user device can obtain the pairing communication from an interactive object, at (620). As described herein, the user device can obtain one or more other pairing communications from one or more other interactive objects.

At (625), the method 600 can include determining a pairing output signal that is emittable by the interactive object. For instance, the user device can determine a pairing output signal that is emittable by the interactive object based at least in part on the pairing communication from the interactive object. The pairing output signal is emittable by the interactive object for pairing with the user device. For example, this can be the pairing output signal indicated in the data payload of the pairing communication provided by the interactive object and obtained by the user device. In some implementations, the user device can determine the pairing output signal that is emittable by the interactive object by, for example, determining at least one of a color associated with the pairing output signal or a sound associated with the pairing output signal based at least in part on the pairing communication (e.g., by analyzing the data in the pairing communication, creating/updating/reviewing a pairing data structure, etc.). Additionally or alternatively, the user device can determine the pairing output signal that is emittable by the interactive object by, for example, determining at least one of one or more visual characteristics of the pairing output signal or one or more audio characteristics of the pairing output signal based at least in part on the pairing communication. For example, the user device can determine what visual frequency of a light signal and/or pitch of an audio signal to look for when trying to detect the pairing output signal of the interactive object.

At (630), the method 600 can include activating sensor(s) of the user device based at least in part on the pairing output signal indicated in the pairing communication. For instance, the user device can activate one or more sensors of the user device based at least in part on the pairing output signal indicated in the pairing communication. For example, the user device can activate a visual sensor (e.g., a camera, etc.) and/or an audio sensor (e.g., a microphone, etc.) in the event that the pairing output signal indicated in the pairing communication is a light signal and/or an audio signal.

At (635A-B), the method 600 can include detecting the pairing output signal from the interactive object. For instance, at (635A), the interactive object can generate the pairing output signal via one or more output devices. As described herein, the pairing output signal can include at least one of a visual signal or an audio signal of the interactive object. At (635B), the user device can detect the pairing output signal from the interactive object via one or more sensors of the user device. This can include obtaining sensor data indicative of the pairing output signal and applying an image/audio recognition model that can parse the sensor data to identify the visual and/or audio characteristics of the pairing output signal.

At (640), the method 600 can include pairing the user device with the interactive object. For instance, the user device (and/or interactive object) can pair the user device with the interactive object based at least in part on the pairing communication and the pairing output signal. This can include a pairing operation to open a communication linkage between the user device and the interactive object (e.g., a pairing operation based on BLE protocol, etc.). The use device can pair with the interactive object (or vice versa) based at least in part on the interactive object identifier indicated in the pairing communication. In some implementations, the interactive object can provide a haptic feedback (e.g., a vibration to the user, etc.) upon a successful pairing (e.g., based at least in part on a confirmation provided from the user device and obtained by the interactive device configured to provider the haptic feedback, etc.).

At (645), the method 600 can include obtaining sensor data indicative of an interactive object action. For instance, as described herein, the user device can be paired with the interactive object based at least in part on the pairing communication and/or the pairing output signal generated/emitted by the interactive object. The interactive object can obtain sensor data indicative of an interactive object action. The interaction object action can include a gesture action. By way of example, an inertial measurement unit (and/or other sensors) of the interactive object can detect movement of the interactive object and can generate sensor data indicative of such movement (e.g., 3-D coordinates and associated times descriptive of a motion path of the interactive object, etc.). This movement can be associated with a gesture action (e.g., a spell-like motion, etc.) performed by the user of the interactive object (e.g., the individual holding the interactive object, etc.).

In some implementations, the time bounds of the interactive object action can be dictated by user input to the interactive object. By way of example, the interactive object can detect a first user input associated with an interactive object action (e.g., provided by the user to the interactive object, etc.). This can be a user input provided after the interactive object and the user device are paired. The first user input (e.g., a first button press, a press and hold input of a button, a first handle squeeze that is held and/or released, a first voice command, etc.) can be indicative of a start time of the interactive object action. The interactive object can start recording sensor data based at least in part on the first user input. The user can perform the interactive object action and the interactive object can record the corresponding sensor data. The interactive object can detect a second user input associated with an interactive object action (e.g., provided by the user to the interactive object, etc.). This can be a user input provided after the first user input associated with the interactive object action. The second user input (e.g., a second button press, a release of a button, a second handle squeeze, a handle release, a second voice command, etc.) can be indicative of an end time of the interactive object action. The interactive object can stop recording sensor data associated with interactive object action based at least in part on the second user input.

The interactive object action can also, or alternatively, include other actions such as a user input to the interactive object to trigger an interactive object action (e.g., a button press, etc.) and the interactive object can obtain sensor data indicative of such actions via its various hardware components.

At (650), the method 600 can include providing data indicative of the interactive object action. For instance, the interactive object can provide, to the user device, data indicative of an interactive object action. This can include, for example, coordinate data and time(s) associated with a motion path of the interactive object during the performance of an interactive object action (e.g., a gesture action, etc.). The user device can obtain the data indicative of the interactive object action, at (655).

At (660), the method 600 can include performing a user device action based at least in part on the interactive object action. For instance, the user device can perform a user device action based at least in part on the interactive object action. This can include the opening of an application, activating a component of the user device and/or other device to which the user device is communicatively coupled, and/or other actions as described herein. In some implementations, the interactive object can provide a haptic feedback (e.g., a vibration to the user, etc.) upon a successful completion of an interactive object action and/or user device action (e.g., based at least in part on a confirmation provided from the user device and obtained by the interactive device configured to provide the haptic feedback, etc.). This can indicate to the user that the gesture action (e.g., a spell, etc.) was successful.

In some implementations, the interactive object may not provide data indicative of an interactive object action to the user device. For example, the user device can obtain sensor data indicative of the interactive device action via sensor(s) of the user device (e.g., a camera, microphone, etc.). This can include the user device observing the motion of the interactive object action and/or obtaining data indicative of a user voice command via the sensor(s) of the user device (e.g., a camera, microphone, etc.). The user device can determine the interactive object action based at least in part on this sensor data. The user device can perform a user action accordingly, as described herein.

In some implementations, the interactive object and the user device can be unpaired. For example, the user can provide user input associated with an unpairing action to the interactive object. This can include, for example, a gesture action, a release of the interactive object (e.g., the handle, etc.), one or more button activations, etc. The interactive object can detect the user input associated with the unpairing action. The interactive object can provide data indicative of the unpairing action to the user device. The user device can obtain the data indicative of the unpairing action (e.g., from the interactive object via BLE protocol, etc.). The user device (and/or the interactive object) can unpair the interactive object and the user device based at least in part on the data indicative of the unpairing action.

In some implementations, the user device can then be available to and/or look to pair with another interactive object. In some implementations, the user device and the interactive object can unpair based at least in part on a user input to the user device (e.g., activation of a UI element on a user interface displayed via a display device, etc.).

In some implementations, the interactive object can communicate/initiate an action by a device endpoint without pairing with that device endpoint. For example, a user device can be located within the vicinity of the interactive object. The user device can be, for example, a toy crystal ball or some other physical object. In some implementations, the user device may not be associated with the user of the interactive object. For example, this user device may be associated with another user. In some implementations, the user device may be associated with the interactive object (e.g., sold with/transferred in the same packaging, etc.).

The user device can be configured to poll for communications from the interactive object. For example, the user device can be configured to poll for BLE advertising packets at a particular frequency (e.g., every 10, 20, 30, 50 ms, etc.). The user of the interactive object can perform an interactive object action (e.g., via a spell like motion, etc.). The interactive object can detect the motion (e.g., taps, swipes, shakes, etc.) associated with the interactive object action (e.g., via the microcontroller obtaining data from the accelerometer/gyroscope, etc.). In the event a particular motion is detected, the interactive object can provide communications that include an interactive object identifier, data indicative of the interactive object action/detected motion, and/or other meta-data structured in such a way that a user device polling for communications can recognize those being provided by the interactive object.

The user device can be configured to perform an action based at least in part on the interactive object action, although the user device and the interactive object are not paired (at least not yet). For instance, the user device can obtain the communication received from the interactive object and perform a response action based at least in part on the communication. By way of example, the user device can be configured to activate one or more output devices (e.g., lights, speakers, etc.) to emit a visual signal and/or an audio signal. In some implementations, a color associated with the visual signal emitted by the user device can be associated with the particular interactive object (and/or the user of the interactive object). In some implementations, a sound associated with the visual signal can be associated with the particular interactive object (and/or the user). In some implementations, multiple user devices can respond to a single communication from an interactive object and perform a corresponding action.

In some implementations, the interactive object can be paired with a first user device and initiate an action on a second user device that is not paired with the interactive object. For instance, the user of the interactive object can perform an interactive object action and data indicative of that interactive object action can be communicated to a first user device that is paired with the interactive object. As described herein, the first user device (e.g., mobile phone, etc.) can determine the interactive object action based at least in part on the data provided by the interactive object. This can be done, for example, by inputting received motion data (e.g., coordinate/time data, etc.) into a recognizer model associated with a software application running on the mobile phone, as described herein. The first user device can determine an interactive object action classification based at least in part on the interactive object action (e.g., the output of the recognizer model, etc.). The interactive object action classification can indicate the type of interactive object action performed (e.g., the particular spell, etc.). The first user device can provide data indicative of the interactive object action classification to the interactive object, with which the first user device is paired. The data indicative of the interactive object action classification can include, for example, an identifier indicating the type of action performed by the user (e.g., an ID associated with the spell performed by the user, etc.).

The interactive object can obtain the data indicative of the interactive object action classification from the first user device. The interactive object can provide/broadcast communication(s) (e.g., advertising packets, etc.) indicative of the interactive object action classification. A second user device that is listening for such communications (e.g., polling for advertising packets, etc.) can obtain the communication(s) indicative of the interactive object action classification. The second user device (which is not paired with the interactive object) can perform an action based at least in part on the communication(s) received from the interactive object. For example, as described herein, the second user device can activate one or more output devices (e.g., to emit certain colors of lights, certain sounds, etc.) based at least in part on the interactive object action classification (e.g., indicating the spell performed by the user, etc.). In this way, the pairing of the interactive object and the first user device can extend the capability of the interactive object to control other user devices that are not paired with the interactive object.

Figure 7:
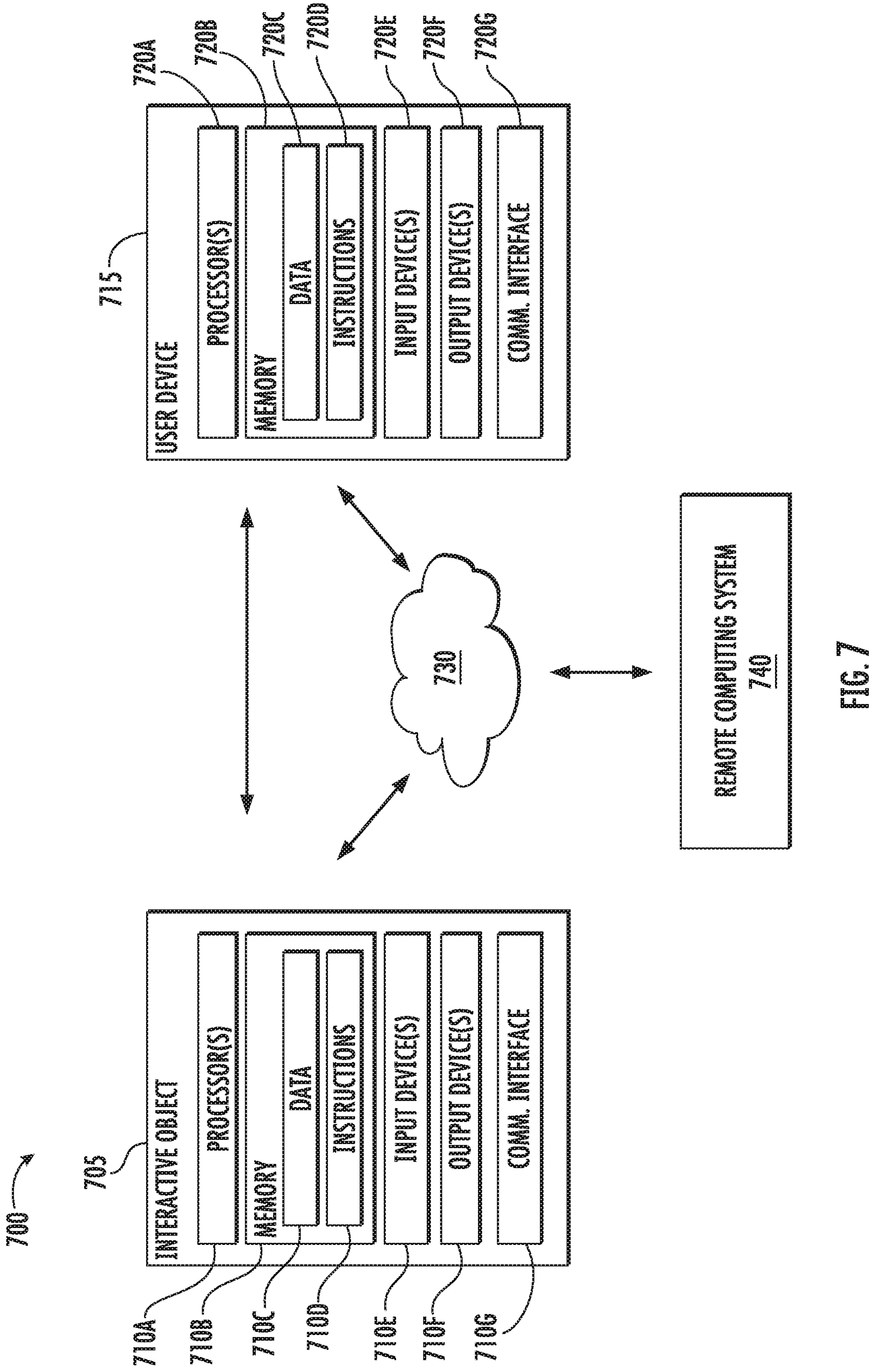
FIG. 7 depicts example components of an example computing system according to example aspects of the present disclosure.

FIG. 7 depicts example components of an example computing system 700 according to example aspects of the present disclosure. The system 700 can include interactive object(s) 705 and one or more user device(s) 715. The interactive object(s) 705 and the user device(s) 715 can respectively correspond to the interactive object(s) 100, 210A-F and user device(s) 215A-F described herein. The interactive object(s) 705 and the user device(s) 715 can communicate via one or more near range communication protocols (e.g., BLE protocol, etc.). In some implementations, the system 700 can include one or more remote computing systems 740 (e.g., cloud-based server systems, etc.). The interactive object(s) 705, the user device(s) 715, and/or the remote computing system(s) 740 can be configured to communicate via one or more network(s) 730.

The interactive object(s) 705 can include one or more computing device(s). The computing device(s) can include one or more processor(s) 710A and one or more memory device(s) 710B. The one or more processor(s) 710A can be any suitable processing device (e.g., a processor core, a microprocessor, an ASIC, a FPGA, a controller, a microcontroller, etc.) and can be one processor or a plurality of processors that are operatively connected. The memory device(s) 710B can include one or more non-transitory, computer-readable media that collectively store instructions that when executed by the one or more processors 710A (the interactive object) cause the one or more processors 710A (the interactive object) to perform operations. The memory device(s) 710B can include one or more non-transitory, computer-readable storage media, such as RAM, ROM, EEPROM, EPROM, flash memory devices, magnetic disks, etc., and/or combinations thereof.

The memory device(s) 710B can store information accessible by the one or more processor(s) 710A, including computer-readable instructions 710D that can be executed by the one or more processor(s) 710A. The instructions 710D can be any set of instructions that when executed by the one or more processor(s) 710A, cause the one or more processor(s) 710A (the interactive object) to perform operations. In some embodiments, the instructions 710D can be executed by the one or more processor(s) 710A to cause the one or more processor(s) 710A (the interactive object 705) to perform operations, such as any of the operations and functions of an interactive object (and/or its hardware components) or for which the interactive object (and/or its hardware components) are configured, as described herein, one or more portions of any of the methods/processes described herein (e.g., method 600, etc.), and/or any other operations or functions, as described herein. The instructions 710D can be software written in any suitable programming language or can be implemented in hardware. Additionally, and/or alternatively, the instructions 710D can be executed in logically and/or virtually separate threads on processor(s) 710A.

The one or more memory device(s) 710B can also store data 710C that can be retrieved, manipulated, created, or stored by the one or more processor(s) 710A. The data 710C can include, for instance, data indicative of user input, data indicative of a pairing communication, data indicative of an interactive object identifier, data indicative of a pairing output signal, sensor data, data indictive of an interactive object action, data associated with an unpairing action, algorithms and/or models, data indicative of haptic feedback, data indicative of successful pairing/action completion, and/or other data or information. The data 710C can be stored in one or more database(s). The one or more database(s) can be connected to the interactive object 705 by a data channel, by a high bandwidth LAN or WAN, or can also be connected to the interactive object(s) 705 through network(s) 730. The one or more database(s) can be split up so that they are located in multiple locales.

The interactive object(s) 705 can also include a communication interface 710G used to communicate with one or more other component(s) of the system 700 including, for example, near range and/or over the network(s) 730. The network interface 710G can include any suitable components for interfacing with one or more network(s), including for example, transmitters, receivers, ports, controllers, antennas, chips, or other suitable components.

The interactive object(s) 705 can include one or more input devices(s) 710E and/or one or more output devices(s) 710F. The input devices(s) 710E can include, for example, hardware and/or software for receiving information from a user (e.g., user input). This can include, for example, one or more sensors (e.g., inductive sensors, IMUs, etc.), buttons, touch screen/pad, data entry keys, a microphone suitable for voice recognition, etc. The output device(s) 710F can include hardware and/or software for visually or audibly producing signals. For instance, the output device(s) 710F can include one or more lighting elements (e.g., LED, ultrasound emitter, infrared emitter, etc.), display device, one or more speaker(s), etc.

The user device(s) 715 can be any suitable type of computing device, as described herein. A user device 715 can include one or more processor(s) 720A and one or more memory device(s) 720B. The one or more processor(s) 720A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 720B can include one or more non-transitory, computer-readable media that collectively store instructions that when executed by the one or more processors 720A (the user device) cause the one or more processors 720A (the user device) to perform operations. The memory device(s) 720B can include one or more non-transitory, computer-readable storage media, such as RAM, ROM, EEPROM, EPROM, flash memory devices, magnetic disks, etc., and/or combinations thereof.

The memory device(s) 720B can include one or more computer-readable media and can store information accessible by the one or more processor(s) 720A, including instructions 720D that can be executed by the one or more processor(s) 720A. For instance, the memory device(s) 720B can store instructions 720D for running one or more software applications, displaying a user interface, receiving user input, processing user input, pairing/unpairing with an interactive object, performing user device actions, etc. The instructions 720B can be executed by the one or more processor(s) 720A to cause the one or more processor(s) 720A (the user device) to perform operations of the user device(s) (or for which they are configured) as described herein, one or more portions of any of the methods/processes described herein (e.g., method 600), and/or any other operations or functions, as described herein. The instructions 720D can be software written in any suitable programming language or can be implemented in hardware. Additionally, and/or alternatively, the instructions 720D can be executed in logically and/or virtually separate threads on processor(s) 720A.

The one or more memory device(s) 720B can also store data 720C that can be retrieved, manipulated, created, or stored by the one or more processor(s) 720A. The data 720C can include, for instance, data indicative of a user input, data indicative of user input, data indicative of a pairing communication, data indicative of an interactive object identifier, data indicative of a pairing output signal, sensor data, data indictive of an interactive object action, data associated with an unpairing action, data indicative of pairing data structure, data indicative of a user device action, data indicative successful pairing and/or actions, algorithms and/or models, and/or other data or information. In some implementations, the data 720C can be received from another device.

The user device(s) 715 can also include a network interface 720G used to communicate with one or more other component(s) of system 700 (e.g., an interactive object 705) via near range communication and/or over the network(s) 730. The network interface 720G can include any suitable components for interfacing with one or more network(s), including for example, transmitters, receivers, ports, controllers, antennas, or other suitable components.

The user device(s) 715 can include one or more input devices(s) 720E and/or one or more output devices(s) 720F. The input devices(s) 720E can include, for example, hardware and/or software for receiving information from a user, such as a touch screen, touch pad, mouse, data entry keys, a microphone suitable for voice recognition, etc. In some implementations, the input device(s) 720E can include sensor(s) for capturing sensor data (e.g., associated with a pairing output signal, interactive object action, voice command, etc.). The output device(s) 720F can include hardware and/or software for visually or audibly producing information/signals for a user. For instance, the output device(s) 720F can include one or more speaker(s), earpiece(s), headset(s), handset(s), etc. The output device(s) 720F can include a display device, which can include hardware for displaying a user interface and/or messages for a user. By way of example, the output component 720F can include a display screen, CRT, LCD, plasma screen, touch screen, TV, projector, and/or other suitable display components. In some implementations, the user device 715 may not include a display device.

The network(s) 730 can be any type of communications network, such as a local area network (e.g. intranet), wide area network (e.g. Internet), cellular network, or some combination thereof and can include any number of wired and/or wireless links. The network(s) 730 can also include a direct connection between one or more component(s) of system 700. In general, communication over the network(s) 730 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

For data transmission described herein, data transmitted from one device to another may be transferred directly or indirectly. For example, data transmitted from one device to another may be transferred directly from one device to another without an intermediate device or system. Data transmitted from one device to another may be transferred directly from one device to another with an intermediate device or system. The data may be altered, processed, or changed in some way by the intermediate device or system.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for device pairing, comprising:

detecting, by an interactive object, user input with the interactive object;

in response to detecting the user input, generating, by the interactive object, a pairing communication for a user device, wherein the pairing communication comprises an interactive object identifier and data defining one or more characteristics of a pairing output signal that is subsequently emittable by the interactive object;

providing, by the interactive object, the pairing communication to the user device via a radio frequency communication protocol; and generating, by the interactive object, the pairing output signal via one or more output devices, wherein the pairing output signal comprises at least one of a visual signal or an audio signal of the interactive object.

2. The computer-implemented method of claim 1, wherein the interactive object comprises a wand-like form factor.

3. The computer-implemented method of claim 1, wherein the pairing output signal comprises the visual signal, wherein the visual signal comprises a light signal.

4. The computer-implemented method of claim 3, wherein the data defining one or more characteristics of the pairing output signal is indicative of one or more visual characteristics associated with the light signal, the one or more visual characteristics comprising a color of the light signal.

5. The computer-implemented method of claim 3, wherein the data defining one or more characteristics of the pairing output signal is indicative of one or more visual characteristics associated with the light signal, wherein the one or more visual characteristics comprises at least one of a frequency of the light signal, a duration of the light signal, or a pattern associated with the light signal.

6. The computer-implemented method of claim 1, wherein the pairing output signal comprises the audio signal, wherein the audio signal comprises a sound.

7. The computer-implemented method of claim 6, wherein the data defining one or more characteristics of the pairing output signal is indicative of one or more audio characteristics associated with the audio signal, wherein the one or more audio characteristics comprise at least one of a frequency of the sound, a pitch of the sound, a volume of the sound, or an amplitude of the sound.

8. The computer-implemented method of claim 1, wherein the pairing communication comprises a radio wave advertising packet.

9. The computer-implemented method of claim 1, wherein the user device comprises a mobile phone.

10. The computer-implemented method of claim 1, wherein the user device is paired with the interactive object based at least in part on the pairing communication and the pairing output signal, the method further comprising:

providing, by the interactive object to the user device, data indicative of an interactive object action, wherein the interaction object action comprises a gesture action.

11. An interactive object comprising:

one or more processors; and one or more tangible, non-transitory, computer readable media that collectively store instructions that when executed by the one or more processors cause the interactive object to perform operations, the operations comprising:

detecting user input associated with the interactive object, wherein the user input comprises a physical contact with the interactive object;

generating a pairing communication based at least in part on the user input, wherein the pairing communication comprises an interactive object identifier and data defining one or more characteristics of a pairing output signal that is subsequently emittable by the interactive object;

providing the pairing communication to a user device via a radio frequency communication protocol; and generating the pairing output signal via one or more output devices of the interactive object, wherein the pairing output signal comprises at least one of a visual signal or an audio signal of the interactive object.

12. The interactive object of claim 11, wherein the interactive object comprises a wand-like form factor and the user device comprises a phone, and wherein the interactive object is paired with the user device based at least in part on the pairing output signal generated by the interactive object.

13. The interactive object of claim 11, wherein the data defining one or more characteristics of the pairing output signal is indicative of a color of the visual signal and wherein generating the pairing output signal via the one or more output devices of the interactive object comprises generating a light signal of the color.

14. The interactive object of claim 11, wherein the data defining one or more characteristics of the pairing output signal is indicative of one or more timing characteristics of the visual signal and wherein generating the pairing output signal via the one or more output devices of the interactive object comprises generating a light signal in accordance with the one or more timing characteristics.

* * * * *